United States Patent [19]

Alafandi et al.

[11] 4,238,360
[45] Dec. 9, 1980

[54] AMMONIATED SILICA-ALUMINA GEL AND CATALYST CONTAINING THE SAME AND PROCESSES FOR PRODUCING SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 3,879

[22] Filed: Jan. 16, 1979

Related U.S. Application Data

[63] Continuation-in-part of Ser. No. 935,628, Aug. 21, 1978, and Ser. No. 769,118, Feb. 16, 1977, Pat. No. 4,142,995, and Ser. No. 874,755, Feb. 3, 1974, Pat. No. 4,198,310.

[51] Int. Cl.³ .................. B01J 27/24; B01J 27/02; B01J 29/06
[52] U.S. Cl. .................. 252/438; 252/440; 252/455 R; 252/455 Z
[58] Field of Search .................. 252/438, 440, 455 R, 252/455 Z

[56] References Cited

U.S. PATENT DOCUMENTS

| | | | |
|---|---|---|---|
| 3,346,512 | 10/1967 | Gladrow et al. | 252/455 Z |
| 3,423,332 | 1/1969 | Maker et al. | 252/455 R |
| 3,437,604 | 4/1969 | Micholko | 252/455 Z |
| 3,536,604 | 10/1970 | Jaffe | 252/455 Z |
| 3,551,509 | 12/1970 | Thomas et al. | 252/455 Z |
| 4,085,069 | 4/1978 | Alafandi et al. | 252/455 Z |
| 4,139,493 | 2/1979 | Mickelson | 252/455 R |
| 4,142,995 | 3/1979 | Alafandi et al. | 252/455 Z |

*Primary Examiner*—Delbert E. Gantz
*Assistant Examiner*—William G. Wright
*Attorney, Agent, or Firm*—Philip Subkow; Bernard Kriegel

[57] ABSTRACT

This invention relates to hydrothermally treated silica-alumina cogels resulting in a reduction in the NH₄ content of the gel and the employment of such gels as cracking catalysts.

15 Claims, 1 Drawing Figure

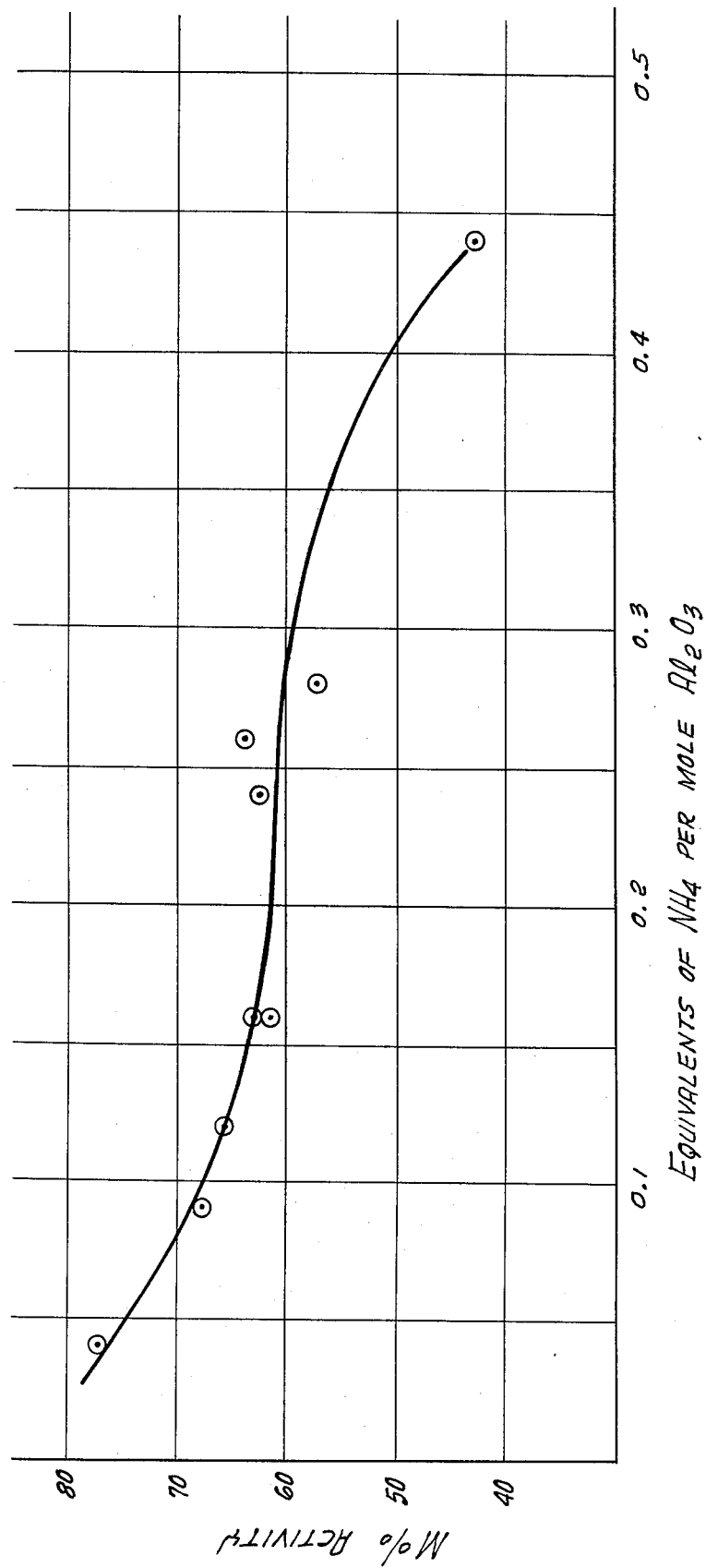

AMMONIATED SILICA-ALUMINA GEL AND CATALYST CONTAINING THE SAME AND PROCESSES FOR PRODUCING SAME

BACKGROUND OF THE INVENTION

This application is a continuation-in-part of applications, Ser. No. 935,628; filed Aug. 21, 1978; and Ser. No. 769,118; filed Feb. 16, 1977 now U.S. Pat. No. 4,142,991, patented Mar. 6, 1979 and Ser. No. 874,755; filed Feb. 3, 1974 now U.S. Pat. No. 4,198,310.

Prior to the introduction of the exchanged crystalline zeolites of the faujasite type, as a catalyst for cracking of hydrocarbons, a commonly used catalyst was composed of a silica-alumina cogel containing from about 3 to about 25 percent by weight of $Al_2O_3$ on a volatile free basis.

Because of the substantially higher activity of the catalyst formed from crystalline zeolite, they have replaced to a large measure the silica-aluminum cogels as the primary component of a hydrocarbon conversion catalyst.

The literature relating to silica-alumina gels and their catalytic properties is extensive (see Iler, "The Colloid Chemistry of Silica and Silicates", Chapter VI, Cornell Press [1955] Ed.) and citations there given. Milliken, et al; Discussions Faraday Society, No. 8; Heterogenous Catalysis, p. 279, etc. [1950]; Mills, et al, J. Am. Chem. Soc. Volume 72, pp. 1554-1560 [1950]. See also: Erickson, U.S. Pat. No. 2,872,410; Winyall, U.S. Pat. No. 2,886,512; Wilson, U.S. Pat. No. 3,124,541; Magee, et al, U.S. Pat. No. 3,433,748; Haden, U.S. Pat. No. 3,065,054, Maher et al., U.S. Pat. No. 3,423,332, Lussier et al., U.S. Pat. No. 3,974,099.

STATEMENT OF THE INVENTION

We have discovered that the catalytic cracking activity of the silica-alumina cogels which are substantially free of sodium or other alkali metal cations may be materially improved by digesting the cogel at an elevated temperature in the presence of solutions containing hydrogen, ammonium or polyvalent cations such as rare earth or alkaline earth cations.

Gels so treated may, depending on the gel and the reaction system and the conditions of treatment, remain in the amorphous state or develop a crystalline phase.

Gels which have ammonium cations associated with the gel are herein referred to as ammoniated gels. Such gels for example may contain substantial concentrations of ammonium cations.

Gels may also be formed substantially free of ammonium cations by reacting sodium aluminate with an aluminum salt and maintaining the mixture on the acid side. The sodium content of the acid gel may be similar to that of the ammoniated gel. We refer to such gels as acid gels.

While the hydrothermal treatment of the acid gel according to the process of our invention produces a gel of substantial catalytic activity superior activity is obtained by treatment of the ammoniated gel.

In the case of the ammoniated gels the improvement in catalytic activity obtained by the hydrothermal treatment is increased by treatment at a temperature in excess of about 150° F. In such ammoniated gels, preferably those containing $SiO_2/Al_2O_3$ molar ratio of less than about 3, substantially free of sodium cations, the catalytic activity of the gel is increased to a degree which is dependent on the concentration of the ammonium cation associated with the treated gel. Preferably the $NH_4$ content of the gel, expressed as $NH_3$, is in the range from less than about 0.3 and preferably less than 0.2 equivalents of ammonium per mole of $Al_2O_3$.

The activity produced from such gels depends on the conditions of the hydrothermal treatment and the ionic system. A crystalline phase may develop or the gel may remain amorphous and a reduction in the ammonium content of the gel and an increase in the catalytic activity of the gel may be obtained in both cases.

The activity may be measured by the microactivity cracking test described in the Oil and Gas Journal of Sept. 16, 1966; page 48, etc.; and Nov. 22, 1975; page 60, etc.

In the following examples the conditions in carrying out the above tests is as follows. The calcined pelleted catalyst was first steamed at temperatures and for times specified below and then used in cracking of a petroleum fraction under the following conditions. The oil charge is a wide boiling range high sulfur feed stock (boiling range about 430° to 1000° F.). The catalyst to oil ratio is 4. The weight hourly space velocity is 16.45 grams of oil per gram of catalyst per hour. The temperature of the reactor is 910°. The percent conversion is reported as the volume of liquid condensate product of boiling point range of up to 421° F. based on the volume of liquid charge. The percent conversion when the catalyst is tested after calcination of the catalyst in air for two hours at 1450° F. is termed M activity. When the calcined sample is steamed at 1500° F. for two hours, prior to testing it is termed the S activity. When the calcined sample is first steamed for two hours at 1550° F., prior to testing it is termed S+ activity.

The process of our invention includes the treatment of a silica-alumina cogel containing less than about 1% of $Na_2O$ based on the cogel on a volatile free basis by a hydrolytic treatment of the gel. The treatment may be carried out in the presence of monovalent cations other than alkali metal cations such as hydrogen or ammonium or polyvalent cations such as rare earth cations or alkaline metal cations. We prefer to carry out the hydrothermal treatment under acid conditions rather than at higher pH as for example under alkaline conditions. A superior amplification in the activity by reductions in ammonium content in the gel is obtained by treatment under acid conditions.

Under relatively mild and controlled hydrothermal conditions of temperatures below about 300° F., the reaction of the gel having low $Na_2O$ content, results in an amorphous gel which exhibits superior catalytic activity as compared with the original gel. At temperatures above about 350° F. and at suitable concentrations of cations and time of digestion a crystalline phase develops.

The crystalline phase generated under acid conditions by reactions with rare earth salts under temperature in excess of 300° F. have an activity which is characteristic of the so called ultra-stable cracking catalysts.

The crystalline phase is characterized by an X-Ray spectrum in which characteristic peaks occur. Excessive exposure of the gel for prolonged periods of time particularly at the higher temperatures may deleteriously affect the catalytic activity of the deammoniated gel although a successful reduction in ammonium content is achieved.

For purposes of describing the result of the process of treating the ammoniated gel with water or a solution of a salt, whereby the NH$_4$ content of the gel is reduced, we refer to the process as an "exchange" and the cation as "associated" with the gel.

The reduction in the ammonium content of the cogel by the process of our invention results in the reduction in the ammonium content when the hydrolytic process occurs in the presence of acid hydrogen or ammonium salts that is in the absence of metallic cations. We observe, however, that in the case of such hydrothermal treatment with polyvalent cations the treated gel has associated therewith the polyvalent cations employed in the hydrothermal treatment. The polyvalent cations may be alkaline earth cations or the metallic cations of the transition element or the lanthanide series of the periodic table with rare earth cations of Group 3b and the lanthanide period of the periodic table preferred. Such rare earth cations are available commercially as mixtures (see infra).

The hydrothermal treatment improves the activity of the silica-alumina gel whether the gel is ammoniated or is an acid gel.

When the acid cogel of substantially the same SiO$_2$/Al$_2$O$_3$ molar ratio, which is the same as in the case of ammoniated gel, that is one free of ammonium cations, is reacted with rare earth cations under hydrothermal conditions, we obtained an amorphous gel of substantial activity but of an activity inferior to that produced by treatment of an ammoniated gel.

We prefer to hydrothermally treat the ammoniated silica-alumina cogel in the presence of a water solution of rare earth salts under acid conditions preferably at a pH from about 4 to about 6 and at temperatures in the range of about 150° F. to about 450° F. under suitable autogenous pressure conditions for a period of about two to four hours. Excessive temperatures or excessive acidity or excessive duration of treatment will depreciate the resultant activity, from that which is obtained under the more controlled reaction conditions.

The gel is mixed with water or water containing a suitable salt, acidified, if necessary to the desired pH, and then heated at temperatures from about 150° F. to about 450° F. under autogenous pressure where the temperature is above the boiling point. In such cases a temperature is selected to be in the range between about 250° F. and 450° F.

The exchanged gel may, but need not, be combined with a matrix material, such as kaolin clays, for example ball clay or halloysite, or acid treated halloysite or an inorganic oxide gel, for example silica gel or the hydrated alumina such as pseudoboehmite and mixtures thereof. Such matrix materials, have been used with faujasite type catalysts in the prior art and are useful additives with the treated gels of our invention. The art of incorporating matrix materials with active catalysts, such as for example zeolites, is well known and such matrix compositions may be employed with the treated cogels of our invention.

We prefer to employ the matrix in more limited ratios, for example, from about 5% to 25% of the matrix and from about 95% to about 75% of the exchanged gel.

The cogel, which we prefer to treat by the process of our invention to form the catalyst of our invention may be produced by any of the methods used in the prior art to form such cogels in which the treatment results in a gel having an ammonium ion associated with gel as in the ammoniated gel referred to above.

The cogel, which may be hydrothermally treated according to our invention, may be formed by treating a mixture of silica hydrosol with aluminum salt in the ratios to produce a gel of the desired SiO$_2$/Al$_2$O$_3$ ratio and exchanged with ammonium cation to reduce the sodium content of the gel.

We prefer to coprecipitate the silica-alumina hydrosol to form the gel from a mixture of sodium silicate and aluminum salt, e.g. aluminum sulfate, or aluminum nitrate or aluminum chloride made alkaline with ammonium hydroxide to reduce the sodium content as is more fully described below.

We have found that the improvement in the catalytic activity of a gel treated according to our invention depends on the silica to alumina ratio of the cogel. The ammonia content of the ammoniated gel of our invention depends on the silica to alumina ratio of the gel. The catalytic activity attainable by our invention is substantially greater as the molar weight ratio of SiO$_2$ to Al$_2$O$_3$ is less than about 3 and preferably about 1 to about 2.

Our preferred embodiment of our invention is to employ an ammoniated silica-alumina cogel having an SiO$_2$/Al$_2$O$_3$ molar ratio in the range of about 1.25 to about 2.5, and an ammonium ion content of less than about 0.3 equivalents of ammonium cation per mole of Al$_2$O$_3$ to form a catalyst having a M activity in excess of 60%.

The preferred embodiment of the process for producing the preferred embodiment of the cogel is to hydrothermally treat an ammoniated cogel with an acid solution of rare earth cations at an elevated temperature to reduce the ammonia content of the gel as stated above. While we have found that the reaction conditions which produce an exchanged cogel of low ammonium content and which has a high M activity may also contain a crystalline phase of characteristic x-ray spectrum, gels which are produced under milder conditions may be amorphous and have superior M and S+ activities.

We prefer to employ the gel formed when using the ammoniated cogel formed from aluminum sulfate, when the gel is to contain a crystalline phase.

FIG. 1 and the following examples and tables illustrate our invention. Example 1 describes the ammoniated cogel such as has been employed in the examples except as is hereinafter indicated.

EXAMPLE 1

5.017 grams of sodium silicate (28% SiO$_2$+8.9% Na$_2$O by weight) equivalent to 1,440 grams of SiO$_2$ is dissolved in water. The solution is acidified to a pH of 11 with sulfuric acid. 26,896 grams of an aluminum sulfate solution (equivalent to 1,560 grams of Al$_2$O$_3$) is added gradually to the acidified slurry with constant agitation. The pH at the end of the addition of the aluminum sulfate should be in the range of about 3 to about 3.5. The solution is passed through a colloid mill to be well homogenized. The homogenized solution is made alkaline with ammonium hydroxide with constant and vigorous agitation to adjust the mixture to a pH of about 8.5 to about 9.

The mixture is vigorously stirred and the pH is maintained in the range of about 8.5 to about 9 by suitable adjustment for about 1 hour to insure uniformity of the mixture. It is then heated to a temperature of about 75° to 80° C. for about 30 minutes and then immediately filtered and the filter cake washed with hot distilled water of about 80° C. The washed filter cake is then slurried to a solid content of about 5% in distilled water which contained about 2% of ammonium nitrate and then filtered. The filter cake is then again slurried with ammonium nitrate solution as in the last previous step. The filter cake from the last step is again reslurried in an ammonium nitrate solution as above and filtered. The filter cake from the last filtration above is washed with distilled water.

The silica-alumina hydrogen thus produced is preferably maintained in a sealed container prior to use in the catalyst of our invention. It should be used as promptly as possible since aging of the gel will impair its properties in producing a good attrition resistant catalyst.

The gel produced as in Example 1 analyzed on a volatile free basis as follows:
$SiO_2$ = 48.7% by weight
$Al_2O_3$ = 51.1% by weight
$Na_2O$ = 0.27% by weight
$NH_3$ = 3.67% by weight The pore volume, the distribution of the pore volume according to their diameters and the surface area of the gel were determined (see J.A.C.S. [1938] Vol., p. 309, etc.):
Surface area ($\overline{M}^2$/gram) equals 712;
Total pore volume (cc/gram) equals 0.67;
Surface area in pores of 30 to 600 Angstroms diameters equals 457 $\overline{M}^2$/grams;
Pore volume of pores of 30 to 600 Angstroms diameters equals 0.51 cc/gram;
Percent of pore volume as percent of the volume in pores of 30 to 600 A (Angstroms) equals:
300 to 600 A = 0.1
200 to 300 A = 0.1
100 to 200 A = 0.6
50 to 100 A = 11.2
30 to 50 A = 88

Pore volume distribution as percent in pores of 10 to 300 Angstroms radius pores:

| Pore Radius | | Percent |
|---|---|---|
| 200 to 300 A | = | 0 |
| 150 to 200 A | = | 0 |
| 100 to 150 A | = | 0 |
| 50 to 100 A | = | .1 |
| 25 to 50 A | = | 9.7 |
| 10 to 20 A | = | 89.6 |

The ammoniated cogel is amorphous to K alpha copper radiation at 500 counts per second on the counter of the strip chart x-ray apparatus. It showed no discernable peaks in the x-ray spectrum so produced. The gel produced as above, was employed in the following examples, except in Example 19 where the acid gel was used. In all examples and except as is indicated in Example 7, where xerogel was employed, all of the examples employed the hydrogel.

The above cogel was pelleted and tested by the microcativity test identified above after steaming at 1450° F. for two hours (M activity) and again another sample after steaming at 1500° F. for two hours (S activity) and a third sample after steaming for 2 hours at 1550° F. (S+ activity). The results are reported as volume percent conversion.

The results obtained were as follows:

| | M | S | S+ |
|---|---|---|---|
| Volume % conversion: | .43 | 36.5 | 46 |

The gel was also mixed with acid treated halloysite (see Secor; U.S. Pat. Nos. 2,935,463, and 3,446,727) in the ratio of 90% by weight of the dried gel and 10% by weight of the dry halloysite. The mixture was tested as above with the following results:

| | M | S+ |
|---|---|---|
| Volume % conversion | 47 | 44 |

EXAMPLE 2

The procedure of Example 1 was used to form the cogel, but instead of aluminum sulfate, above as a source of $Al_2O_3$, an equivalent amount of aluminum nitrate and sodium aluminate in ratio to give 75% of the $Al_2O_3$ to come from sodium aluminate ($NaAlO_2$) and 25% from the aluminum nitrate. The gel was analyzed with the following results on a volatile free basis:
$SiO_2$ = 49.6%
$Al_2O_3$ = 49.8%
$Na_2O$ = 0.13%
$NH_3$ = 2.40%
Surface area $\overline{M}^2$/gram equals 708;
Pore volume cc/gram equals 0.84;
Surface area in pores of 30 to 600 Angstroms diameter equals 489 $\overline{M}^2$/gram;
Pore volume in pores of 30 to 600 Angstroms diameters equal 0.7 cc/gram;
Pore volume distribution and percent of pore volume in pores of 30 to 600 Angstroms diameter:
300 to 600 A equals 0.5%
200 to 100 A equals 0.6%
100 to 200 A equals 7.9%
50 to 100 A equals 50.5%
30 to 50 A equals 40.5%;
Pore volume distribution as percent of pore volume in pores of:
200 to 300 A equals 0.3%
150 to 200 A equals 0.2%
100 to 150 A equals 0.5%
50 to 100 A equals 6.9%
25 to 50 A equals 44.6%
10 to 25 A equals 47.5%;

The pore volume is more uniformly distributed between the pores of 30 to 100 Angstrom diameters in comparison with those of the gels of Example 1.

EXAMPLE 3

300 grams (on a volatile free basis) of the silica-alumina gel produced as in Example 1 was mixed with a solution of rare earth sulfate, equivalent to 75 grams of ReO in water to form a slurry containing about 6% of solids. The composition of the rare earth sulfate expressed as oxides and symbolized as ReO was:
$La_2O_3$ = 57% by weight
$CeO_2$ = 16% by weight
$Nd_2O_3$ = 21% by weight
Other rare earth oxides = 7% by weight
100 grams of ReO (volatile free) is equal to 1.896 equivalents of ReO, i.e., 52.7 grams per equivalent.

The ReO was determined by the standard oxalate method. See Roden, "Analytical Chemistry of the Manhatten Project", McGraw-Hill Co., Chapter 22. In all examples ReO was similarly determined and had the above equivalent value.

The above mixture was held at the temperature of about 180° to 200° F. for about two hours at atmospheric pressure. During the reactions, the pH of the mixture was adjusted to hold a pH in the range of 5.2 to 5.4.

The mixture was filtered and washed. A sample of the filter cake was analyzed on a volatile free basis as follows. The filter cake was analyzed:

$SiO_2 = 43.7\%$ by weight
$Al_2O_3 = 46.3\%$ by weight
$Na_2O = 0.64\%$ by weight
$ReO = 10.2\%$ by weight
$NH_3 = 1.25\%$ by weight
$SO_3 = 0.83\%$ by weight It was amorphous as in the case of the cogel of Example 1.

90% of the dried filter cake was mixed with 10% of acid treated halloysite as in Example 1. The mixture was tested as in Example 2 with the following results:

|  | M | S+ |
| --- | --- | --- |
| Volume % conversion | 62 | 51 |

EXAMPLE 4

The cogel of Example 1 (1000 grams on a volatile free basis) was mixed with lanthanum nitrate solution in an amount to equal 100 grams of ReO (as $La_2O_3$) in water and mixed for one hour at ambient temperature and then heated for one hour at 160° to 170° F. at a pH of 5.2 to 5.4. The exchanged sample was filtered and washed. The washed filter cake was dried at 250° F. for three to four hours and reexchanged as above, filtered, washed, and dried as above. The exchange as described above was repeated for a third time. The resultant exchanged gel contained (on a volatile free basis):

$SiO_2 = 47.4\%$
$Al_2O_3 = 44.3\%$
$La_2O_3 = 8.21\%$
$NH_3 = 1.14\%$
$Na_2O = 0.07\%$

The exchanged gel was amorphous to X-Ray as above.

The gel was formulated with clay as in Example 1 and tested for microactivity by the above test, with the following results:

$M = 63\%$
$S+ = 54\%$

EXAMPLE 5

300 grams (on a volatile free basis) of the cogel described in Example 1 was mixed with rare earth sulfate as in Example 3, in amount equivalent to 21 grams of ReO as described above in 4,700 ml of water. The pH was adjusted with NaOH to a pH of 8. The mixture was agitated for an hour at a temperature of 160° F. at atmospheric pressure. The slurry was filtered and washed until the wash water was substantially free of sulfate ions. The filter cake was analyzed and its analysis on a volatile free weight basis was as follows:

$SiO_2 = 45.5\%$ by weight
$Al_2O_3 = 46.7\%$ by weight
$Na_2O = 0.23\%$ by weight
$ReO = 7.18\%$ by weight
$NH_3 = 2.14\%$ by weight
$SO_3 = 0.23\%$ by weight It was composited as in Example 1 (90% gel and 10% acid treated halloysite) and tested as in Example 2 with the following results:

|  | M | S | S+ |
| --- | --- | --- | --- |
| Volume % conversion | 57 | 53 | 47 |

EXAMPLE 6

The gel of Example 1 was exchanged employing a lanthanum nitrate in solution, in an amount equal to 10% of the gel, both on a volatile free basis. The mixture was held for an hour at ambient temperature at a pH of 5.2 to 5.4, and then heated at a temperature of 160° F. to 170° F. for an hour. The gel was then filtered and the filter cake was washed and dried. The exchanged gel was reslurried in water and reexchanged as described above, filtered, and the filter cake washed and dried. It was analyzed with the following results:

$La_2O_3 = 8.34\%$
$NH_3 = 0.98\%$
$Na_2O = 0.12\%$.

A thousand grams of this gel (on a volatile free basis) was then reslurried in water containing 2,500 grams of ammonium sulfate (on a volatile free basis) to a total volume of 20,000 ml. The mixture was adjusted to a pH of 5 to 5.2 and held for one hour at ambient temperature, and then charged into an autoclave where it was held for two hours at a temperature of 400° F., filtered, washed and analyzed with the following results:

$ReO (La_2O_3) = $ trace
$NH_3 = 3.09\%$
$Na_2O = 0.05\%$
$SO_3 = 4.60\%$

The high concentration of $SO_3$ indicates that it was contaminated with considerable ammonium sulfate, since the original ReO exchanged gel was sulfate free. The $NH_3$ equivalent to the $SO_3$ content should then be subtracted from the 3.09% of the ammonia to indicate the ammonia remaining in the gel in exchanged position to wit equal to 0.57%. The gel was formulated as in Example 1 and tested for activity with the following results:

$M = 66\%$
$S+ = 60\%$

The gel showed a small percentage of an incipient crystallinity of indeterminate character.

EXAMPLE 7

The gel of Example 1 was dried at 400° F. and the dried mass was reduced to a powder in a hammer mill. The ammoniated xerogel product was dispersed in ammonium sulfate solution containing 10% by weight of the sulfate based on the gel on a volatile free basis. The suspension was digested for thirty minutes at 160° F. The treated slurry was dried and reexchanged as above, drained, and again reexchanged as above, employing in this case 40% of ammonium sulfate based on the gel on a volatile free basis. The gel resulting from the third exchange was filtered and washed. It was analyzed with the following results (volatile free basis):

NH$_3$=3.32%
Na$_2$O=0.2%

The sulfate contents of the filter cake was not determined.

It was amorphous as was disclosed by the X-Ray pattern taken as in Example 1. The gel was formulated into a catalyst as in Example 1, and tested for activity with the following results:
M=60%
S+=52%

EXAMPLE 8

200 grams (volatile free) of the gel of Example 1 were dispersed in water containing 200 grams (on a volatile free basis) of NH$_4$NO$_3$ in two liters of water. The pH of the dispersion was adjusted to a pH of about 4 to about 4.5 and heated for two hours at 160° F. The gel was filtered and washed until the wash water appeared nitrate free. The exchanged gel was analyzed for NH$_3$. The NH$_3$ content of the filter cake was 3.4 on a volatile free basis. The nitrate content of the filter cake was not determined.

The X-Ray spectrum obtained as described in Example 1 showed a small percentage of an incipient crystallinity of undeterminate characteristics at the following d spacings and intensities. It was otherwise generally amorphous.

| d (Angstoms) | I |
|---|---|
| 14.28 | 3 |
| 10.75 | 3 |
| 9.30 | 3 |
| 6.19 | 8 |
| 5.02 | 6 |
| 3.50 | 3 |
| 3.20 | 14 |
| 3.01 | 4 |

It was combined with the acid treated clay as in Example 1 and tested for M microactivity. The activity was:
Volume % conversion=58%.

EXAMPLE 9

The cogel prepared as in Example 1 was heated to 600° to 700° F., and steamed at a temperature of about 1200° F. was passed over the heated cogel for three hours. The cooled cogel was then treated with rare earth as in Example 3. The steamed gel after treatment with the rare earth sulfate was filtered and the filter cake was washed, as in Example 3. It had the following compositions by weight on a volatile free basis:
SiO$_2$=46.4% by weight
Al$_2$O$_3$=50.8% by weight
Na$_2$O=0.20% by weight
ReO=2.09% by weight
NH$_3$=1.05% by weight
SO$_3$=0.48% by weight The treated cogel was mixed with acid treated halloysite as in Example 1 (90% cogel and 10% halloysite) and tested as in Example 1 with the following results:

|  | M | S | S+ |
|---|---|---|---|
| Volume % conversion | 66.0 | 52.0 | 51 |

EXAMPLE 10

1,600 grams of the cogel prepared as in Example 1 (calculated on a volatile free basis) was mixed gradually with 18.4 liters of a rare earth sulfate solution containing 1.96% ReO (23% by weight of the gel) while the mixture was maintained for about an hour at a pH of 5 by adjustment during the mixing. The above slurry was then introduced into an autoclave and heated at a temperature of 400° for about two hours. The mixture was then cooled and filtered. The filter cake was washed until the was water appeared substantially free of sulfate ions. The filter cake analyzed on a volatile free base as follows:
SiO$_2$=45.6% by weight
Al$_2$O$_3$=48.8% by weight
Na$_2$O=0.06% by weight
ReO=4.15% by weight
NH$_3$=0.3% by weight
SO$_3$=0.67% by weight The x-ray spectrum obtained as in Example 1, showed lines having the d spacings and intensities as in the following Table 1.

TABLE 1

| d (Angstoms) | I | I/I |
|---|---|---|
| 6.39 | 6 | 25 |
| 6.26 | 24 | 100 |
| 4.58 | 3 | 12.5 |
| 3.57 | 3 | 12.5 |
| 3.49 | 3 | 12.5 |
| 3.41 | 2 | 8.33 |
| 3.24 | 2 | 8.33 |
| 3.14 | 3 | 12.5 |
| 3.00 | 10 | 42 |
| 2.86 | 3 | 12.5 |
| 2.43 | 2 | 8.3 |
| 2.21 | 6 | 25 |

The cogel treated as above was slurried in water with 10% of acid treated halloysite and 90% of the cogel all measured on a volatile free basis as in Example 1 and subjected to the above test as set forth in Example 1 with the following results:

|  | M | S | S+ |
|---|---|---|---|
| Volume % conversion | 77 | 62 | 56 |

The catalyst composition of Example 10 was modified by mixing the treated silica alumina gel and acid treated halloysite in the following ratios in addition to 90% gel and 10% by weight of acid treated halloysite to wit; 27%, 50%, 70%, and 90% cogel and the remainder acid treated halloysite. The results from employing various compositions in the above test are given in the following table.

The 2 theta reflections from which d spacings are derived, in this table and other tables, infra, may have an undertainty of ±0.1 degree.

TABLE 2

| | 90% | | | 70% % Gel | | | 50% | | | 27% | | |
|---|---|---|---|---|---|---|---|---|---|---|---|---|
| | M | S | S+ | M | S | S+ | M | S | S+ | M | S | S+ |
| Con. Vol. % | | | | | | | | | | | | |
| 77.1 | | 61.5 | 55.5 | 61.6 | 48.1 | 49.9 | 57.9 | | 49.3 | 42.7 | 42.4 | 37.8 |

EXAMPLE 11

The preparation of Example 10 was carried out as described but instead of rare earth sulfate, ammonium sulfate was employed.

1200 Grams (on a volatile free basis) was added gradually to 12,000 cc of water containing 3,000 grams of $(NH_4)_2SO_4$ (on a volatile free basis). The pH was adjusted during addition to a pH of 5.5. The slurry was autoclaved for two hours at 400° F., cooled and filtered. The filter cake was washed until the wash water was substantially free of sulfate ions.

The gel was analyzed on a volatile free basis:
$SiO_2$=48.2% by weight
$Al_2)_3$=51.3% by weight
$Na_2O$=0.10% by weight
$NH_3$=2.43% by weight
$SO_3$=0.99% by weight Since the $SO_3$ is introduced by the ammonium sulfate, the net $NH_3^+$ in exchange position is equal to 2.0% after subtracting the $NH_3$ equivalent to the $SO_3$.

90% of the gel was mixed with 10% of acid treated halloysite as above and tested as in Example 1.

| | M | S | S+ |
|---|---|---|---|
| Volume % conversion | 63 | 59 | 58 |

It will be noted that notwithstanding the presence of about 55 equivalents of $NH_4^+$ per liter, the treatment resulted in a reduction of the $NH_4$ content from 3.67% in the ammoniated gel of Example 1 to 2.0% in the treated gel.

EXAMPLE 12

The procedure of Example 10 was repeated except the the ReO was used in the ratio of 10% by weight of the gel. The exchanged gel had the following composition:
$SiO_2$=44%
$Al_2O_3$=47.6%
ReO=6.81%
$NH_3$=0.75%
$Na_2O$=0.06%

Examined by x-ray as in Example 1, the pattern showed that the gel contained a crystalline phase substantially different from the product of Example 10. The following Table 4 states the d spacings of the reflections.

TABLE 3

| d (Angstroms) | I |
|---|---|
| 8.44 | 44 |
| 4.75 | 4 |
| 4.47 | 5 |
| 4.24 | 4 |
| 4.16 | 3 |
| 3.96 | 3 |
| 3.76 | 3 |
| 3.26 | 4 |
| 3.04 | 3 |

TABLE 3-continued

| d (Angstroms) | I |
|---|---|
| 2.33 | 2 |

The exchanged gel when formulated as in Example 1 had the following results:
M=68.4%
S+=61.6%

EXAMPLE 13

In this example, the gel as in Example 1 was exchanged with magnesium nitrate as a pH of 4 under autogenous pressure at a temperature of 400° F. for two hours, cooled, filtered and washed. The filter cake was analyzed and had the following composition on a volatile free basis:
$Al_2O_3$=50.4% by weight
$SiO_2$=46.9% by weight
$Na_2O$=0.09% by weight
$NH_3$=0.88% by weight
MgO=0.56% by weight
$NO_3$=0.64% by weight The x-ray pattern produced as in Example 1 showed unidentified incipient crystallinity including indications of the presence of the peak characteristics of quartz and halloysite.

TABLE 4

| d (Angstroms) | I |
|---|---|
| 7.22 | 7 |
| 4.43 | 5 |
| 4.28 | 2 |
| 3.61 | 3 |
| 3.56 | 3 |
| 3.35 | 14 |
| 2.56 | 2 |
| 2.35 | 5 |

90% of the gel was mixed with 10% acid treated halloysite and tested as in Example 1 with the following results:
M=56%
S+=45%

EXAMPLE 14

50 grams of the gel of Example 1 were mixed with 1,000 ml of deionized water. The mixture had a pH of about 5.5 and was heated under pressure at a temperature of 400° F., for two hours, cooled and filtered. The filtrate contained ammonium ions equivalent to 0.374 grams of $NH_3$ per liter. This indicates that the pH was raised to the equivalent value, i.e. substantially to neutrality.

The gel was analyzed and found to have lost about a quarter of its ammonium. The x-ray spectrum obtained as in Example 1 showed that the treated gel was amorphous. It was formulated as in Example 1 and had an M activity of 48% and S+ activity of 37%.

The following examples indicate that the hydrothermal treatment may be carried on for too long a time or at excessively high temperatures or both with disadvantageous effect on the catalytic activity of the resultant catalyst. This effect may occur in the case where the resultant gel is either amorphous or contains a crystalline phase. In the latter, the crystallinity is of a different character from the more mildly treated ammoniated gel.

EXAMPLE 15

Example 10 was repeated but the temperature was adjusted to 500° F., and the ReO was employed in a ratio of 33% of the gel, on a volatile free basis, and the digestion was carried on for eight (8) hours and an other for twenty-four (24) hours.

The exchanged gel was analyzed with the following results:

| SAMPLE | | 1<br>8 hrs. | 2<br>24 hrs. |
|---|---|---|---|
| $SiO_2$ | = | 40.6% | 44.6% |
| $Al_2O_3$ | = | 44.3% | 45.2% |
| ReO | = | 8.53% | 9.08% |
| $NH_3$ | = | 0.55% | 1.17% |
| $Na_2O$ | = | 0.83% | 0.17% |

The x-ray pattern obtained as in Example 1 showed a d spacing which included those of Example 10 but also a crystalline phase which included d spacings not appearing in that of the gel of Example 10.

Formulated as in Example 1, the activity of the catalyst was:

| | Sample 1 | Sample 2 |
|---|---|---|
| M | 53 | 41.4 |
| S+ | 46.4 | 43.1 |

TABLE 6

| 8 hours<br>d (Angstroms) | I | 24 hours<br>d (Angstroms) | I |
|---|---|---|---|
| 14.18 | 3 | | |
| 7.86 | 1 | | |
| 7.40 | 4 | | |
| 7.19 | 11 | 7.23 | 14 |
| 6.97 | 1 | | |
| | | 6.47 | 10 |
| 6.25 | 38 | 6.30 | 5 |
| 5.89 | 2 | | |
| | | 4.80 | 12 |
| 4.56 | 16 | | |
| 4.46 | 12 | 4.47 | 24 |
| 4.41 | 2 | | |
| 4.37 | 5 | 4.38 | 7 |
| 4.21 | 5 | | |
| 4.16 | 8 | 4.17 | 10 |
| 4.09 | 5 | | |
| 3.98 | 11 | | |
| 3.77 | 3 | 3.81 | 5 |
| | | 3.68 | 2 |
| 3.56 | 22 | 3.54 | 12 |
| 3.49 | 6 | | |
| 3.33 | 5 | 3.37 | 1 |
| 3.23 | 19 | 3.25 | 7 |
| 3.13 | 8 | | |
| 3.00 | 20 | 3.00 | 2 |
| 2.96 | 8 | | |
| 2.94 | 3 | 2.92 | 2 |
| 2.88 | 2 | | |
| 2.84 | 18 | 2.84 | 1 |
| 2.77 | 7 | 2.77 | 2 |
| 2.62 | 7 | | |
| 2.56 | 9 | 2.56 | 13 |
| 2.54 | 1 | | |

TABLE 6-continued

| 8 hours<br>d (Angstroms) | I | 24 hours<br>d (Angstroms) | I |
|---|---|---|---|
| 2.51 | 3 | 2.50 | 7 |
| 2.33 | 9 | 2.33 | 13 |

EXAMPLE 16

The gel of Example 1 was that exchanged using rare earth sulfate of Example 3 equal to 10% of the weight of the gel on a volatile free basis, and the digestion was carried out for twenty-four (24) hours at 212° F. The resultant washed gel had the following composition:
$SiO_2$ = 48.7%
$Al_2O_3$ = 40.9%
ReO = 7.7%
$NH_3$ = 0.60%
$SO_3$ = 0.81%

It was amorphous to x-ray as above. The gel was tested for microactivity with the following results:
M = 45.6%
S+ = 42%

EXAMPLE 17

A gel formed as in Example 1 was exchanged with ammonium nitrate at a temperature of about 160° to 170° F. for one hour. The pH was adjusted during the exchange with ammonium hydroxide to hold the pH in a range of 5 to 5.2. The mixture was filtered and dried and reexchanged as above. The washed filter cake was exchanged with lanthanum chloride at 250° F. for two hours at a pH of 5 to 5.2. The exchanged zeolite was filtered and washed.

The filter cake analyzed as follows, on a volatile free basis:
$SiO_2$ = 48.1%
$Al_2O_3$ = 42.8%
$Na_2O$ = 0.027%
$NH_3$ = 1.95%
$La_2O_3$ = 7.74%

The exchanged gel was amorphous to x-ray as in the case of Example 1. The exchanged zeolite was mixed with acid treated clay as in Example 1 and tested for microactivity with the following results:
M = 64%
S+ = 55%

EXAMPLE 18

A gel formed as in Example 2 was exchanged with rare earth sulfate at a temperature of 200° F. for three hours and then filtered. The filtrate had a pH of 5.5 The filter cake was washed. A similar second exchange was for three hours and the third similar exchange was for two and a half hours, both at pH adjusted to 5.1 to 5.3. The washed filter cake from the third exchange was analyzed as follows, on a volatile free basis:
$SiO_2$ = 50.0%
$Al_2O_3$ = 45.8%
$Na_2O$ = 0.14%
ReO = 4.20%
$NH_3$ = 0.30%

The exchanged gel was amorphous to x-ray as in Example 1. The filter cake was formulated as in Example 1 and tested for activity with the following results:
M = 67%
S+ = 55%

EXAMPLE 19

In this example an acid gel was employed instead of an ammoniated gel.

Sodium silicate in an amount equivalent to 480 grams of $SiO_2$ (volatile free) and 520 grams of $Al_2O_3$ (volatile free) as aluminum sulfate were mixed in water so as to establish a gel (5% solids), i.e., $SiO_2/Al_2O_3$ molar ratio of 1.6. They were thoroughly mixed. The pH during mixing was adjusted to a pH of about 6.5 by the addition of sulfuric acid. The mixture was heated to about 160° F. for an hour and filtered and washed until the wash water was substantially free of sulfate ions.

The washed gel was exchanged employing a ratio of ReO to gel of 33 grams of ReO as rare earth salt per hundred grams of the gel (on a volatile free basis). The mixture was adjusted with acid to a pH of about 5 and thoroughly mixed for about an hour and introduced into an autoclave and heated for two hours at 400° F. It was then cooled and filtered and the filter cake washed thoroughly. The exchanged gel analyzed on a volatile free basis as follows:

$Na_2O = 0.007\%$
ReO = nil
$NH_4$ = nil

The filter cake was combined with clay as in Example 1 and tested for microactivity with the following results:

M = 61.5%
S+ = 48.7%

The treated gel showed no crystal structure by the x-ray examination as in Example 1. It was amorphous.

The following examples illustrate the effect of the $SiO_2/Al_2O_3$ molar ratio of the ammoniated gel on its activity.

EXAMPLE 20

A gel prepared according to the procedure of Example 1, with the silicate and aluminum salt adjusted in composition to give the following $SiO_2/Al_2O_3$ ratio. It was analyzed as in Example 1, and had the following composition:

$SiO_2 = 25\%$ by weight
$Al_2O_3 = 74.2\%$ by weight
$Na_2O = 0.033\%$ by weight
$NH_3 = 0.25\%$ by weight It was formulated and tested as in Example 1, with the following results:

M = 55%
S+ = 51.7%

The gel of Example 20 was exchanged under pressure and processed as in Example 10. It analyzed as follows:

ReO = 0.15% by weight
$NH_3 = 0.24\%$ by weight

It was formulated with a catalyst and tested as in Example 1 with the following result:

M = 53% by weight

EXAMPLE 21

Another gel was formed as in Example 1, but the ratio of the reactants was adjusted to produce a gel containing 75% $SiO_2$ and 25% $Al_2O_3$ by weight.

The resultant gel analyzed as follows:

$SiO_2 = 73\%$ by weight
$Al_2O_3 = 26.3\%$ by weight
$Na_2O = 0.08\%$ by weight
$NH_3 = 1.06\%$ by weight

EXAMPLE 22

The gel of Example 20 was exchanged under pressure as in Example 10 and analyzed:

ReO = 0.53% by weight
$NH_3 = 0.12\%$ by weight

The microactivity obtained from the gel and matrix as in Example 1 was:

M = 42% by weight

The ammoniated gel which we prefer to employ has a $SiO_2/Al_2O_3$ ratio in the range of about 1 to about 3. Ammoniated gels which have $SiO_2/Al_2O_3$ ratio substantially outside this range do not on deammoniation by the process of our invention attain an activities which is obtainable when employing the preferred gels.

Table 7 tabulates the date of the above examples.

TABLE 7

| Example | % $SiO_2$ | % $Al_2O_3$ | % $NH_3$ | % ReO | Equivalents per mole $Al_2O_3$ $NH_4$ | ReO | $SiO_2/Al_2O_3$ mole ratio | Form C* | A** | Activity M % | S+ % |
|---|---|---|---|---|---|---|---|---|---|---|---|
| 1 | 48.7 | 51.1 | 3.67 | | 0.44 | | 1.67 | | A | 43 | 40 |
| 3 | 43.7 | 46.3 | 1.25 | 10.2 | 0.16 | 0.43 | 1.62 | | A | 62 | 51 |
| 4 | 47.4 | 44.3 | 1.14 | 8.2 | 0.16 | 0.35 | 1.84 | | A | 63 | 54 |
| 5 | 45.5 | 46.7 | 2.14 | 7.18 | 0.28 | 0.3 | 1.65 | | | 57 | 47 |
| 9 | 46.4 | 50.8 | 1.05 | 2.09 | 0.12 | 0.1 | 1.54 | | | 66 | 51 |
| 10 | 45.6 | 48.8 | 0.3 | 4.15 | 0.04 | 0.13 | 1.58 | C | | 77 | 56 |
| 11 | 48.2 | 51.3 | 2.0 | | 0.24 | | 1.6 | C | | 63 | 56 |
| 12 | 44 | 47.6 | 0.75 | 6.81 | 0.09 | 0.27 | 1.55 | C | | 68 | 62 |
| 13 | 46.9 | 50.4 | 0.88 | | 0.06 | | 1.54 | C | | 56 | 45 |
| 15 | 40.6 | 44.3 | 0.55 | 8.53 | 0.07 | 0.38 | 1.58 | C | | 53 | 41 |
| | 44.6 | 45.2 | 1.17 | 9.08 | 0.16 | 0.39 | 1.68 | C | | 46 | 43 |
| 16 | 48.7 | 40.9 | 0.60 | 7.7 | 0.1 | 0.37 | 2.03 | | A | 46 | 42 |
| 17 | 48.1 | 42.8 | 1.95 | 7.74 | 0.26 | 0.31 | 1.90 | | A | 64 | 55 |
| 18 | 50 | 45.8 | 0.30 | 4.20 | 0.24 | 0.18 | 1.84 | | A | 67 | 55 |
| 20 | 25 | 74.8 | 0.25 | | 0.02 | | 0.58 | | | 55 | 52 |

*C-crystalline phase
**A-amorphous

It will be seen that the reduction in the content of ammonium cation by the hydrolytic exchange was accompanied by a substantial increase in activity. The activite appears to be a function of the ammonium content of the exchanged gel. The lower the equivalents of $NH_4$ (reported as $NH_3$) per mole of $Al_2O_3$ the higher the M and S+ activity.

The level of activity depends to some extent on the cations employed. Thus compare the exchange with magnesium cation of Example 13 with Example 12 where the exchange was with an acid solution of rare earth salts. The magnesium salt, where the deammoniation was the greater than with the rare earth salt, the improvement in activity achieved by the exchange with magnesium ion yielded an M of 56% and an S+ of 45% compared with M of 68% and an S+ of 62% for Example 12.

We prefer to employ the rare earth cations under acid conditions. While some appreciation in activity is obtained when using the rare earth salts under mild alkaline conditions, the appreciation in activity is not obtained for like amount of deammoniation. Compare Example 5 with Example 17.

In employing rare earth sulfate for the exchange salt in the hydrolytic treatment of the gel, the improvement in activity obtained by the deammoniation may be depreciated if the temperature or the time of digestion or both are made excessive.

While we do not wish to be bound by any theory of why the facts are as observed, the data tend to indicate that the hydrolytically treated gel forms, whether it be a crystalline or amorphous, a catalytically active structure which is a metastable form. Continued treatment or excessive temperatures transforms the gel and depreciates its activity.

Thus compare Example 16 in which the gel was reduced to an $NH_4$ content comparable with that of Example 18 but with a greatly inferior activity. The digestion time was prolonged excessively.

A like effect was obtained in the case of Example 15 when compared with Example 10 and 12. It will be seen that in the case of the 8 hour digestion in which the ammonium content was severely reduced that the activity attained was substantially inferior to the activities obtained by a similar reduction in $NH_4$ content under lower temperatures and shorter digestion time. A comparison of the "d" spacings for the 8 hour treatment in Example 15, as compared with the "d" spacings of Example 10 indicates a difference in the development of the lattice of these two forms.

The further extension of the digestion time is accompanied by a further transformation in the lattice as a comparison of the "d" spacings of the 24 hour sample of Example 15 products with that of the 8 hour sample will show.

It is thus desirable to limit the level of the hydrothermal treatment so not to prolong the treatment to depreciate the attained activity.

The effect of the silica to alumina ratio of the cogel on the activity attained by our invention is illustrated by Examples 20 and 21. The product of Example 20 in which the $SiO_2/Al_2O_3$ molar ratio was less than 1 had an activity which was substantially greater than that produced from the cogel of Example 21 which had a silica to alumina ratio substantially greater than 3. Although the $NH_4$ concentration of the treated gel was low, the attained activity was inferior to those obtained with the gels of preferred $SiO_2/Al_2O_3$ ratio with like concentrations of $NH_4$ cations compare Example 20 with Example 10.

While the gel formed, as in Example 2, (See Example 18) when deammoniumated gave activities which were greatly superior to that of the original ammoniated gel, it did not produce a catalyst of activity comparable to that obtained by the gel formed from aluminum sulfate, compare Example 18 with Example 10. As observed above, the pore structure of the two gels are substantially different.

It is also noted that although the cogels which may be used are in the hydrogel state as the examples above, the gel may be used in its xerogel form as in Example 7.

While as appears from Examples 7, 8, and 11, the deammoniumation may occur by hydrolytic digestion in an ammonium salt solution or employing a mildly acidified water (Example 14) the degrees of deammoniumation and the resultant appreciation in activity is not achieved as with a rare earth salt solution.

In the case of the exchange with polyvalent cations, the hydrothermal digestion which results in deammoniation of the ammoniated gel also causes an association of the polyvalent cation in the deammoniated gel. The equivalents of the polyvalent cations associated with the gel may be more or less than the equivalents of $NH_4^+$ cations removed from the cogel. Thus, in the case of the rare earth exchange, the equivalents of rare earth cations associated with the hydrothermally treated gel may range from about 0.1 to more than 4, i.e., 4.3, equivalents per mole of $Al_2O_3$ as in the cases of the above Examples. See Table 7.

FIG. 1 which plots the M activity values obtained from the gel of Example 1 in the experiments employing rare earth or ammonium cations under acid conditions in the hydrolytic exchange, in which the reaction conditions were controlled, i.e., Examples 1, 3, 4, 5, 9, 10, 11, 12, and 17.

It will be seen from FIG. 1 that the level of M equals 60% is obtained on reduction of the $NH_4$ cations to about 0.3 (i.e. about 0.2 to about 0.3) equivalents of $NH_4$ per mole of $Al_2O_3$ and that not until the $NH_4$ has been reduced to below about 0.2 equivalents per mole of $Al_2O_3$ has there been a further appreciation of the M activity above about 60%. As a result of a further reduction of the $NH_4$ content below about 0.15 equivalents per mole of $Al_2O_3$ a substantial appreciation of the M activity was obtained.

This relative regularly of the effect of the $NH_4$ content on activity does not appear in the case of the S+ activity. However as will appear from Table 7, the reduction of the $NH_4$ content to produce an M activity above about 60 results in a substantial appreciation in the S+ activity to the region of 50 to 60%. Such M and S+ activities are comparable with the more active catalysts currently available commercially (see U.S. Pat. No. 4,100,108).

As will be observed by reference to Table 7 and FIG. 1. The original cogel having an $NH_4$ content, expressed as $NH_3$, of 3.67% on a volatile free basis and $NH_4$ equivalents of 0.4 per mole of $Al_2O_3$ and a M activity substantially less than current commercial catalysts for cracking of petroleum oils, but substantially higher S+ activity than the so-called Y type catalysts, employing a Y faujasite of about 3 to 4% $Na_2O$, and substantially inferior to the so-called ultrastable catalysts in which the zeolite content contains less than 1% of $Na_2O$ (see U.S. Pat. No. 4,100,108). A reduction in the ammonium content in the range of about 0.3 equivalents of ammonium ion per mole of $Al_2O_3$ results in a substantial increase in the activity. However, a further reduction in the ammonium content made a dramatic increase in both the M activity and the S+ activity. The catalysts thus produced compare very favorably with the commercial catalysts containing a high percentage of the ultrastable type catalyst (see the above Patent).

The hydrolytic treatment according to our invention, may result in either an exchanged gel which is amorphous to x-ray (see Examples 3, 4, 14, 16, 17 and 18) or the gel may contain a crystalline phase (see Examples 10, 11, 12, 13, and 15).

The crystalline phase develops on treatment at superatmospheric pressures, i.e. temperatures above the atmospheric boiling point. The treatment which produces the catalyst of highest activity results in a gel with the crystalline phase having d spacings according to Table 1 (see Example 10).

The 8 hour product of Example 15, while containing d spacings found in Table 1 (see Table 4) also contains many peaks not appearing in the x-ray spectrum of Table 1. The 24 hour sample of Example 15 shows the further transformation of the products resulting from the further digestion. Both samples have substantially inferior activities as compared with the amorphous or crystalline gels of like content of ammonium cations, see supra.

Those skilled in the art will understand from the above disclosure how to determine temperatures, time, cation selection, and concentration to obtain the desired level of activity. The examples illustrate the procedure and results effective parameters and may act as a guide to those who wish to determine these parameters for their particular conditions and desired result.

Our invention relates to a process of hydrolytic treatment of acid silica-alumina gels or ammoniated silica-alumina gels of low sodium content, e.g. having a weight ratio in the range of less than about 1% expressed as $Na_2O$ and having an $SiO_2/Al_2O_3$ mole ratio less than 4 and preferably in the range of about 1 to about 3, and in the case of the ammoniated gels, containing $NH_4$ cations associated with the gel in amount expressed as equivalents of $NH_4$ per mole of $Al_2O_3$ of less than about 4.

The preferred embodiment of our invention employs the treatment of an ammoniated gel with rare earth cations under acid conditions at temperatures above about 150° F. for a time to reduce the $NH_4$ ion content in the gel to less than about 0.15 equivalents of $NH_4$ per mole of $Al_2O_3$ and to employ for such purposes a cogel with a $SiO_2/Al_2O_3$ molar ratio substantially more than 1 and less than 3.

For purposes of maintaining the treated product in an amorphous condition we prefer to maintain the temperature from about 150° to the boiling point under atmospheric conditions.

For purposes of generating a crystalline phase in the gel we prefer to carry out the hydrothermal treatment under autogenous pressure at temperatures up to about 450° F. i.e. 225° F. to about 450° F.

The time of digestion is controlled so as not to be excessive as described above. The time of digestion may be from about 1 hour to about 2 to 4 hours at the above temperatures.

The above procedures for reducing the $NH_4$ content of the ammoniated gel may be employed in combination. Thus the ammoniated gel of Example 1 may be exchanged at atmospheric pressure and reexchanged one or more times in multiple steps. The atmospheric exchanged gel of Example 3 may be reexchanged under pressure under similar procedures as in Example 6. The exchanged gel of Example 3 may be steamed as in Example 5 and exchanged as in Example 5.

Our invention also relates to a silica-alumina cogel having an $SiO_2/Al_2O_3$ ratio of less than 4 preferably in the range of about 1 to about 3 which have been produced by the process of our invention.

The preferred gel is one which has a silica-alumina mole ratio of more than about 1 and up to about 2 and a $NH_4$ content of less than about 0.15 equivalents per mole of $Al_2O_3$ and rare earth cations of about 0.5 to about 5 equivalents per mole of $Al_2O_3$. The gel may be either amorphous or contain a crystalline phase. The preferred gel is one which has an M activity above about 60 and preferably above 65%. The gels of Examples 10, 12, and 18, are illustrative of our preferred embodiment.

The above reference to the activity of the treated gel are to the gel after compounding with the matrix, for example the acid treated halloysite. The activity depends on the concentration of the gel in the matrix (see Example 10). We prefer to maintain the concentration of the treated gel in the matrix so as to obtain an M value above 60 and preferably above 65.

For such purposes the treated gel may be employed with or without a matrix, i.e. alone if desired as for example as a microsphere obtained by spray drying the slurry of the exchanged product by dispersing the washed filter cake in water and spray drying.

Instead of using the exchanged gel either alone or mixed with a relatively catalytically inactive constituent acting as a matrix such as clay, silica gel or alumina gel or other inorganic oxide such as gel or cogel, the exchanged gels produced according to our invention may be combined with an exchanged zeolite. Such as the ammonium or the rare earth or rare earth and ammonium exchanged zeolites or alkaline earth exchanged zeolite either of the faujasite type such as the X or Y zeolite or other crystalline alumino-silicate zeolites such as mordenite, chabazite, erionite and zeolite A.

The mixtures may be in the ratio in the range of about 1% to less than about 50% by weight of the zeolite suitably exchanged, if necessary, to a sodium content as in the case of catalysts of the prior art and the above exchanged silica-alumina gel. In the case of an ammonium or a rare earth ReO exchanged Y or exchanged with both $NH_4$ and ReO, with a $Na_2O$ ratio of less than 5% by weight on a volatile free basis, we may use a minor proportion of about 1 to less than 50% of zeolite based on the mixture of gel and zeolite. A suitable mixture is about 20% by weight of the zeolite to 80% by weight of the cogel all on a volatile free basis. Such mixtures may suitably be combined with matrix material for zeolites in the prior art.

The following example illustrates the qualities of the catalysts produced by a mixture of the rare earth exchanged ammoniated gel of our invention with a conventional exchanged faujasite zeolite. Such novel composite catalysts have a superior hydrothermal stability and catalytic activity to produce a high octane gasoline.

Example 21 illustrates the excellent activity of the mixture of the rare earth exchanged alumina-silica gel of our invention in a mixture with a faujasite type zeolite.

EXAMPLE 23

A Na Y zeolite having an $SiO_2/Al_2O_3$ ratio of 4.74 was dispersed in water and acidified with sulfuric acid to a pH of about 3.5. The resultant slurry was heated to a temperature of 160° F. to 180° F. with a rare earth salt solution employing the rare earth sulfate of Example 10.

The washed filter cake of the above slurry was analyzed and contained 10.8% ReO and 3.8% $Na_2O$ on a volatile free basis. The 19% of the exchanged zeolite 47% ball clay when formulated with 16% acid treated halloysite and 18% pseudoboehmite in a slurry and spray dried and tested by the above microactivity test with the following results:

M=73%
S+ =30%

A portion of the above filter cake was mixed with the washed filter cake of the exchanged silica-alumina gel of Example 10 in the ratio to give 10% rare earth exchanged Y zeolite and 90% of the exchanged gel on a volatile free basis. The slurry of the mixed filter cakes was dried.

The resultant catalyst containing the zeolite and gel was tested by the above microactivity test with the following results:
M=83%
S+ =73%

This activity may be compared with that of the catalyst referred to previously in this Example 23. The spray dried slurry of the mixed filter cake as above, was tested by the fluid cracking test.

A test oil (ASTM Subcommitted D32, Standard FHC 893) is vaporized and passed through a bed of microspheres produced by the above spray drying of the mixed filter cakes. Spray dried microspheres are of a particle size within the range of 50 to 70 microns.

In the particular test, the catalyst charge was 4.00±0.05 grams and 1.33±0.03 grams of oil was passed through the catalyst bed over a period of 75 seconds. The catalyst was prepared by heating a shallow bed of the catalyst for three hours in air at 1050° F. and then steamed as in the above microactivity test at 1450° F. for two hours and another sample was steamed at 1550° F. for two hours. The oil passed through a preheat zone and through a bed of the microspheres maintained at a temperature of 900°±2° F. at a weight hourly space velocity (WHSV) of 16.

$$WHSV = \frac{1.33}{4} \times \frac{3600}{75} = 16$$

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which boiled above 421° F. and the fraction of the liquid condensate boiling below 421° F., is determined. The volume and temperature of the gases collected over the water are measured and the volume reduced to standard conditions. The uncondensed gases are analyzed and the weight percent of the gases which is hydrogen, isopentane, and hexane is determined and their weight percent of the feed determined. The weight percent conversion of the liquid charge is determined from the following relation:

F is the weight in grams of the oil passing through the reactor;
L is the weight in grams of the liquid product which is collected as condensate;
R is the percent by weight in grams of the fraction of the liquid condensate which boils above 421° F.;
H is the grams of liquid held up in the reactor exit line and around the reactor, receiver, and joints.

In the above test it has been determined that H constitutes three percent of the feed F. The weight percent conversion (%C) is given by the following relationship.

$$\%C = \frac{F - \frac{R \times L}{100} - .03H}{F} \times 100$$

The weight percent of the gasoline is given by the sum of the percent by the weight to the fraction boiling below 421° F. and the weight percent of the isopentane and hexane.

The coke which is deposited on the catalyst is obtained by burning the coke off of the catalyst remaining after the test and the weight of carbon deposited is determined from the $CO_2$ generated. The weight percent of the feed which appears as carbon is thus determined.

The spray dried microspheres which were heated with steam at 1450° F. and another sample which was heated at 1550° F. each for two hours as above, were each tested by the above test with the following results:

| °F. | Conversion Wt. % | Gasoline % | Coke % | Hydrogen | Isobutane |
|---|---|---|---|---|---|
| 1450° | 72.7% | 45.4% | 6.60% | .077 | 5.18 |
| 1550° | 56.1% | 36.51% | 5.73% | .082 | 2.29 |

The gasoline had a 90.6 octane value according to the test procedure described in: Anderson, et al. "Calculation of the Research Octane Number of Motor Gasoline from Gas Chromatograph Data and a New Approach to Motor Gasoline Quality Control", Journal of the Institute of Petroleum, Vol. 53, March 1972, pp. 83–94.

When using the above exchanged ammoniated gel with a zeolite, we prefer to use the exchanged gel mixed with the rare earth exchanged zeolites of the prior art with an $Na_2O$ content of less than about 4–5%, for example 3.5% and preferably the so-called A type (see U.S. Pat. No. 4,100,108). We prefer to employ the Y zeolite of an $SiO_2/Al_2O_3$ ratio of above 4 for example 4.5. The percent of the zeolites and the gel on a volatile free basis may be about 5% to 25% of the mixture, the exchanged gel.

Instead of mixing the exchanged gel with the exchanged zeolite as above, we may combine the zeolite either in the sodium form or exchanged as above with the gel such as the gel of Example 1. (See our applications Ser. Nos. 769,118 filed Feb. 6, 1977 now U.S. Pat. No. 4,142,995 and 874,755 filed Feb. 3, 1978, now U.S. Pat. No. 4,198,319) The zeolite may be partially exchanged for example with $NH_4$ or rare earth or with both for example to reduce the $Na_2O$ to about 3 to about 6% of the exchanged gel on a volatile free basis. The spray dried zeolite and gel may then be exchanged, preferably with an acid solution of rare earth salts as is described in the above examples.

Our invention includes the use of the hydrothermally treated gel of our invention either alone or combined with a matrix as above, and whether or not combined with a zeolite as described above, in catalytic process other than straight catalytic cracking as described above. Such processes include other hydrocarbon conversion process such as, for example, hydrocracking, hydroforming and hydrodesulfurizing process. Promoters employed in the prior art in catalysts for such process may be employed with the hydrothermally treated gels of our invention.

We claim:

1. A process for producing an active cracking catalyst which comprises exchanging an ammoniated silica-alumina gel containing $NH_4$ ions associated with the gel in an amount, substantially in excess of about 0.3 equivalents per mole of alumina ($Al_2O_3$), and having a $SiO_2/Al_2O_3$ molar ratio in the range of less than 3 with a solution of a salt of a monovalent cation other than alkali metal cation, or a polyvalent cation or both said cations, and reducing the $NH_4$ associated with the gel to substantially less than 0.3, equivalents per mole of $Al_2O_3$ in the gel, and separating said exchanged gel.

2. A process for producing an active cracking catalyst which comprises exchanging an ammoniated silica-alumina gel containing $NH_4$ ions associated with the gel substantially in excess of 0.3 equivalents per mole of $Al_2O_3$ in the gel and sodium expressed as $Na_2O$ of less than 1% of the ammoniated gel on a volatile free basis, and having a $SiO_2/Al_2O_3$ molar ratio in the range of about less than about 3 with solution of a salt of a monovalent cation, other than alkali metal cation, or a polyvalent cation or with both said monovalent cation and polyvalent cation and separating said exchanged gel.

3. The process of producing a cracking catalyst which comprises forming a silica-alumina gel having a $SiO_2/Al_2O_3$ molar ratio of more than about one and less than about 2.5 and associated with sodium ions expressed as $Na_2O$ substantially less than about 1% based on the gel on a volatile free basis and treating said ammoniated gel by heating said gel in a solution containing monovalent cations other than alkali metal cations, or polyvalent cations or both said cations, to reduce the $NH_4$ content of the gel to less than about 0.3 equivalents of $NH_4$ per mole of $Al_2O_3$ in the gel and separating said exchanged gel.

4. The process of claim 1, 2, or 3, including heating said ammoniated gel during said exchange at a temperature of about 150° F. to about 450° F.

5. The process of claim 1, 2 or 3 in which the solution is acidified.

6. The process of claim 1, 2 or 3 in which the cation in the solution is a rare earth cation.

7. The process of claim 1, 2 or 3 in which the solution is an acid solution of a rare earth salt and the exchange is at a temperature of about 150° F. to about 450° F.

8. The process of claims 1, 2 or 3 in which the solution is acidic and contains $NH_4$ cations and the exchange is at a temperature of about 150° F. to about 450° F.

9. The process of claims 1, 2, or 3 in which the temperature during exchange is not more than atmospheric boiling temperature, and in which the separated exchanged gel is amorphous.

10. The process of claims 1, 2, or 3 in which the solution contains $NH_4$ cations and the temperature is not more than the atmospheric boiling temperature and in which the separated exchanged gel is amorphous.

11. The process of claims 1, 2, or 3 in which the solution contains rare earth cations and the temperature is not more than the atmospheric boiling temperature and in which the exchanged gel is amorphous.

12. An ammoniated silica-alumina gel having a $SiO_2/Al_2O_3$ molar ratio more than 1 and less than 3 and containing less than 0.3 equivalents of $NH_4$ cations per mole of $Al_2O_3$ in the gel and rare earth cations.

13. An ammoniated silica-alumina gel having a $SiO_2/Al_2O_3$ molar ratio in the range of in excess of 1 and less than about 2.5 and containing ammonium cation in amount substantially less than 0.3 equivalents per mole of $Al_2O_3$ and sodium expressed as $Na_2O$ of less than about 1% by weight of the exchanged gel on a volatile free basis.

14. An ammoniated silica-alumina gel of $SiO_2/Al_2O_3$ ratio or more than 1 and less than 3 and containing less than 0.3 equivalents of $NH_4$ cations and from about 0.1 to more than 0.4 equivalents of rare earth cations expressed as ReO cations per mole of $Al_2O_3$ in the gel.

15. An ammoniated silica-alumina gel having a $SiO_2/Al_2O_3$ molar ratio in the range of more than 1 and up to about 2 and containing less than about 1.5 equivalents of ammonium cation per mole of $Al_2O_3$ in the gel and from about 0.1 to more than 0.4 equivalents of ReO per mole of $Al_2O_3$ and sodium expressed as $Na_2O$ of less than about 0.5% by weight of the gel on a volatile free basis.

* * * * *